(12) United States Patent
Spalding et al.

(10) Patent No.: US 9,375,884 B2
(45) Date of Patent: Jun. 28, 2016

(54) OPTICAL SCANNER AND PROJECTION APPARATUS FOR THERMAL MANAGEMENT OF COMPOSITE REPAIRS

(71) Applicants: John F. Spalding, Renton, WA (US); Kristen Sharp, Mt. Pleasant, SC (US); Meredith M. Bird, Mt. Pleasant, SC (US); Melissa Lutz, Charleston, SC (US)

(72) Inventors: John F. Spalding, Renton, WA (US); Kristen Sharp, Mt. Pleasant, SC (US); Meredith M. Bird, Mt. Pleasant, SC (US); Melissa Lutz, Charleston, SC (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 14/253,256

(22) Filed: Apr. 15, 2014

(65) Prior Publication Data
US 2015/0290886 A1    Oct. 15, 2015

(51) Int. Cl.
| | | |
|---|---|---|
| *B29C 73/12* | (2006.01) | |
| *H05B 1/02* | (2006.01) | |
| *H05B 3/34* | (2006.01) | |
| *B29C 73/32* | (2006.01) | |
| *B29C 73/34* | (2006.01) | |
| *B29C 35/02* | (2006.01) | |
| *G01K 1/02* | (2006.01) | |
| *B29L 31/30* | (2006.01) | |
| *B29C 73/30* | (2006.01) | |

(52) U.S. Cl.
CPC ............. *B29C 73/12* (2013.01); *B29C 35/0288* (2013.01); *B29C 73/32* (2013.01); *B29C 73/34* (2013.01); *G01K 1/026* (2013.01); *H05B 1/023* (2013.01); *H05B 3/342* (2013.01); *B29C 73/30* (2013.01); *B29L 2031/3082* (2013.01); *G01K 2213/00* (2013.01)

(58) Field of Classification Search
CPC .. B29C 66/91214; B29C 73/10; B29C 73/12; B29C 73/30; B29C 73/32; B29C 73/34; B29L 2031/3082; G01K 2213/00; H05B 3/342
USPC ......... 156/64, 94, 98, 351, 359, 378; 219/221
See application file for complete search history.

(56) References Cited

U.S. PATENT DOCUMENTS

2014/0200731 A1* 7/2014 Evens ..................... B29C 73/12
                                                         700/300

* cited by examiner

*Primary Examiner* — George Koch
(74) *Attorney, Agent, or Firm* — Joseph M. Rolnicki; Evans & Dixon, L.L.C.

(57) ABSTRACT

An apparatus for thermal management of a composite plies and adhesive applied to a repair area on a composite structure uses a combination of an optical scanner and projection system, coded photogrammetric targets, a coded two-dimensional thermocouple array and a coded heat blanket that all communicate with a computerized control system that develops spatial relationships between the composite structure being repaired, the repair area of the composite structure, the thermocouples used to monitor the temperatures in the repair area and the heat blanket used to heat the repair area. The optical scanner and projection system projects identifications of the thermocouples and the real time temperatures of the thermocouples at the positions of the thermocouples over the repair area on the composite structure.

20 Claims, 10 Drawing Sheets

OPTICAL SCANNER AND PROJECTION APPARATUS FOR THERMAL MANAGEMENT OF COMPOSITE REPAIRS

FIELD

This disclosure pertains to an apparatus and its method of use in the thermal management of hot bonded composite repairs of composite structures or metal bond repairs to metal structure. The apparatus uses a combination of a photogrammetric scanner and projection system, coded photogrammetric targets, a coded thermocouple array and a coded heat blanket to develop spatial relationships between the composite structure being repaired, the composite repair, the thermocouples used to monitor the temperatures in the repair area, and the heat blanket used to heat the composite repair.

BACKGROUND

The use of composites is becoming more common in the transportation and other industries. For example, composites are used in the construction of aircraft fuselages, boat hulls and automobile bodies. Because of this, much more emphasis is being placed on the re-work or repair of these high value composite structures and the technologies used to improve the first pass quality of the repair to avoid the time and cost of re-working the repair.

Because the repair of composite structures involves the heat curing of composite plies and adhesive applied to a repair area of the composite structure, the thermal management of the composite plies and the adhesive is a critical part of the repair. Composite plies and adhesives have a specific cure temperature at which they can be successfully cured. This cure temperature will vary with the materials being used to execute a repair. The process instruction or manufacturer data sheet will specify the required cure temperature and dwell time at this temperature. Additionally, they will specify maximum allowable deviation from this set point. The allowable deviation can be as small as ±5° F. Any temperature excursions beyond the allowable range can result in a rejected repair. To further complicate matters, composite structures can vary in thickness considerably across the repair location. The thick areas of structure typically run much cooler than the thin areas. If the repair mechanic does not correctly manage the temperature gradient across the repair an unacceptable repair will result.

The current practice of thermal management of a composite repair first involves the repair operator applying the appropriately sized composite ply(s) and adhesive to the repair area of the composite structure. The repair operator then attaches thermocouples to the composite structure around and over the repair area using adhesive tape. Each thermocouple location is then labeled by the repair operator for identification purposes. The repair operator also individually labels the plug end of each thermocouple wire.

Some potential thermal management problems encountered in the initial steps of the repair include mislabeling thermocouples. It is not unusual for the labels given to each thermocouple location to be illegible. Additionally, the labels may be incorrect. For example, two thermocouples could be labeled with the same identifying number or a thermocouple could be labeled with one number and the plug end of the thermocouple wire could be labeled with a different number.

The repair operator then creates a hand drawn sketch or map of the composite structure repair area. Each individual thermocouple location and the identification number of the thermocouple are noted on the sketch.

However, the thermocouple sketch or map made by the repair operator could be inaccurate. The sketch of the repair area itself may be inaccurate or the scale or perspective of the repair area in the sketch could be skewed. This leads to confusion regarding the actual thermocouple locations relative to the repair area and the composite structure.

The repair operator then attaches any required separator films, bleeders and caul sheets on the composite structure over the repair area as required for the particular repair procedure. These obscure the actual locations of the thermocouples relative to the repair area on the composite structure.

The repair operator, to the best of their ability, then attaches a heat blanket to the composite structure over the repair area without having a direct view of the actual repair area which is hidden under the separator films, bleeders and caul sheets that have previously been attached to the composite structure. Thus, when the heat blanket is placed over the repair area and the thermocouples, it may not be properly centered relative to the repair area and the thermocouples. If the heat blanket is not centered over the repair area, the heat provided by the heat blanket to the repair area and the thermocouples could be very non-uniform.

The operator then attaches any remaining separator films or bleeder layers to the composite structure over the heat blanket. A vacuum bag is then attached to the composite structure over the layers previously attached. The repair operator then attempts to locate the position of each thermocouple under the vacuum bag and mark and label on the vacuum bag each thermocouple location and the identification of the thermocouple. Sometimes a bump is visible at each thermocouple location, but in many cases, the caul sheets and vacuum bag totally obscure the thermocouple locations. In these instances the repair operator must rely on the thermocouple sketch or map to determine the locations of the thermocouples relative to the composite structure repair area. Often the determinations of thermocouple locations are best guesses.

The repair operator then plugs each plug end of each individual thermocouple into a hot bonder. Complicated repair areas having irregular shapes or large repair areas can require forty or more thermocouples to be used over the repair area, increasing the possibility for mistakes being made. Each thermocouple transmits temperature information of the thermocouple to the hot bonder which is then displayed on a screen of the hot bonder.

The repair operator then begins the cure cycle for the composite structure repair area. The hot bonder is activated and controls the heat blanket to apply heat to the repair area and the thermocouples positioned over the repair area. The operator monitors the temperatures of the thermocouples displayed on the hot bonder screen. If a particular thermocouple is seen to be too cold on the display of the hot bonder screen, the operator consults the hand-drawn sketch or map and the markings of the thermocouple positions and identities on the vacuum bag to determine the location of the particular cold thermocouple under the bag and relative to the repair area. The repair operator then places external insulation on the vacuum bag over the area surrounding the particular thermocouple that is reading too cold to increase the temperature of this area. The repair operator then returns to the hot bonder screen to monitor the thermal response of the thermocouple that was reading too cold on the hot bonder screen.

The external insulation applied to the vacuum bag during the curing process obscures the thermocouple markings placed on the vacuum bag by the repair operator. The repair operator is unable to see the markings identifying the thermocouple and its position relative to the repair area under the insulation. This can cause confusion of the repair operator, especially if a repair is turned over to another operator on a different shift, during the curing process resulting in inconsistencies in the quality of the composite repair.

The operator continues to monitor the hot bonder screen to identify any particular thermocouples reading too low that would require insulation placed on the vacuum bag over the particular thermocouples for the duration of the composite repair cure, which is typically 4-8 hours. During this time, the operator may add and remove external insulation from the repair many times, as needed.

SUMMARY

The optical scanner and projection apparatus for thermal management of composite structural repairs that is the subject of this disclosure overcomes the problems of the current practice of thermal management of a composite repair set forth above. The apparatus employs a hot bonder, a heat blanket and a vacuum bag as well as separator films, bleeders and caul sheets as needed that are the same types as those described earlier that are used in the current practice of thermal management of composite repairs of composite structures. In addition, the apparatus also employs a photogrammetric optical scanner and projection system and a plurality of thermocouples arranged in a two-dimensional thermocouple array where the plurality of thermocouples are fixed in the thermocouple array at spaced relative positions of the thermocouples. The apparatus also employs structure targets that can be attached to the composite structure to be repaired that are scannable by the photogrammetric scanner, array targets on the thermocouple array that are scannable by the photogrammetric scanner, blanket targets attached to the heat blanket that are scannable by the photogrammetric scanner, and a computerized control system that communicates with the hot bonder, the heat blanket, the vacuum bag, the optical scanner and projection system and the thermocouple array to control the curing of composite ply(s) and adhesive applied to the repair area on the composite structure.

In use of the apparatus the photogrammetric optical scanner and projection system is first set up relative to the repair area of the composite structure. The system is directed toward the composite structure so that the optical scanner can scan the repair area and the projector can project onto the surface of the composite structure over the entire repair area and portions of the composite structure surrounding the repair area.

The structure targets are then placed on the composite structure at positions surrounding the repair area. The targets are placed at locations that will not interfere with the repair and will be outside of the area on the composite structure to be covered by the vacuum bag.

The repair area on the composite structure is then scanned by the photogrammetric scanner controlled by the computerized control system. The scanning operation identifies the locations of the structure targets that had been previously attached to the composite structure. The scan also identifies the location of the repair area relative to the structure targets and also identifies details of the repair area. All of this information is recorded by the computerized control system.

With information on the repair area having been scanned and recorded, a repair composite ply or plies are cut and assembled. The repair plies and adhesive are applied to the composite structure in the repair area.

Any required separator films, bleeder materials and caul sheets are then attached to the composite structure over the repair area in accordance with the particular repair procedure.

The thermocouple array with attached array targets is then attached to the composite structure with the array centered over the repair area. A scan is then made of the composite structure over the repair area by the photogrammetric scanner to identify the locations of the array targets, read information provided by the array targets and identify the position of the thermocouple array relative to the repair area and the structure targets previously attached to the composite structure. This information is recorded by the computerized control system.

The heat blanket with attached blanket targets is then attached to the composite structure over the thermocouple array and the repair area. The photogrammetric scanner then scans the composite structure and identifies from the blanket targets the particular heat blanket being used, the dimensions and orientation of the heat blanket relative to the thermocouple array and the repair area, and the location of the heat blanket relative to the structure targets, the thermocouple array and the repair area. This information is recorded by the computerized control system.

The components of the vacuum bag assembly are then attached to the composite structure at a position of the vacuum bag that covers the heat blanket, the thermocouple array and the repair area, but is within the structure targets previously attached to the composite structure. Even though the view of the repair area, the array targets on the thermocouple array, and the blanket targets on the heat blanket are obscured by the vacuum bag attached to the composite structure, the computerized control system of the apparatus controls the photogrammetric optical scanner and projection system to project information on the vacuum bag that identifies the locations of the repair area, the thermocouples of the thermocouple array, the identification of each thermocouple in the thermocouple array and the real-time temperature of each thermocouple.

The wiring from the thermocouples of the thermocouple array is then electrically communicated with a thermocouple integrator/pass-through box. The thermocouple integrator/pass-through box is then electrically communicated with the computerized control system of the apparatus and the hot bonder. The computerized control system integrates the location and size of the repair area relative to the structure targets on the composite structure, the identifications and locations of the thermocouples in the thermocouple array relative to the repair area and the structure targets on the composite structure, and the orientation and position of heat blanket relative to the repair area, the thermocouples in the thermocouple array and the structure targets on the composite structure. Based on these spatial relationships, the computerized control system automatically determines which thermocouples in the thermocouple array are positioned over the repair area and are required to control the cure of the composite ply(s) and adhesive applied to the repair area. These thermocouples are identified as "active" thermocouples in the thermocouple array. The identification and temperature information from the active thermocouples is communicated to the hot bond controller. This information is also communicated to the photogrammetric optical scanner and projection system.

The hot bonder is programmed and operated normally. The heat blanket is activated to supply heat to the repair area and the area of the composite structure covered by the heat blanket to initiate the cure of the composite ply(s) and adhesive applied to the repair area. During the cure the projection system is active. The projection system projects on the vacuum bag at each location of the active thermocouples information on the identity of the thermocouple and the real-time temperature of the thermocouple. The projected information could be numerical, could be color coded or both. By watching the projected thermal data, the repair operator knows precisely where additional insulation must be placed on the vacuum bag, or insulation removed from the vacuum bag. Insulation is adjusted as required until a uniform temperature is achieved across the repair area. With a uniform temperature achieved across the repair area, the cure process continues until complete.

The features, functions, and advantages that have been discussed can be achieved independently in various embodiments or may be combined in yet other embodiments further details of which can be seen with reference to the following description and drawings.

DETAILED DESCRIPTION

Figure 1:
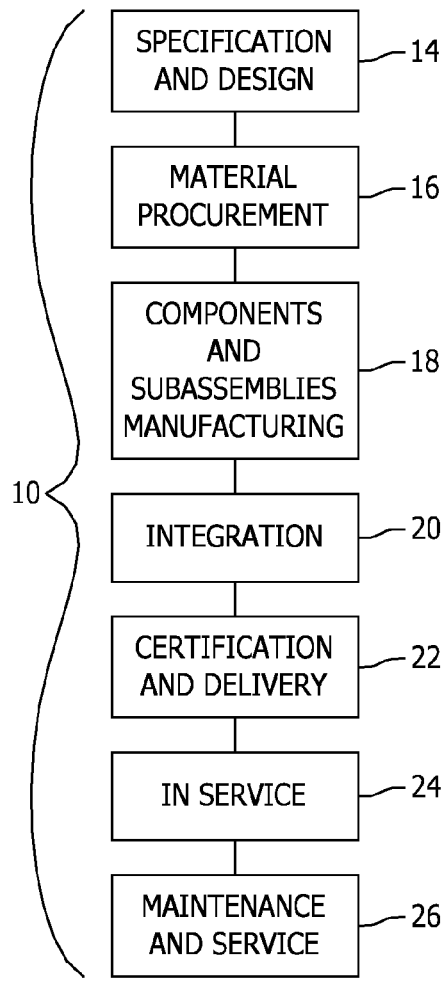
FIG. 1 is a flow diagram of aircraft production and service methodology.
Figure 2:
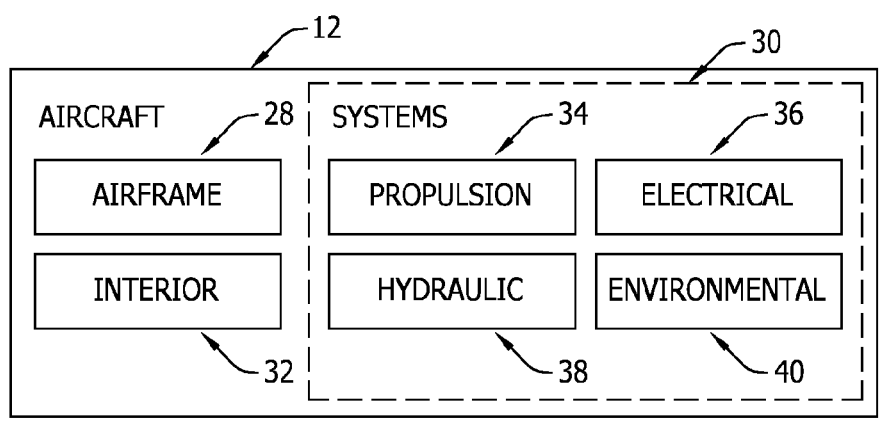
FIG. 2 is a block diagram of an aircraft.

Referring more particularly to the drawings, embodiments of the disclosure may be described in the context of an aircraft manufacturing and service method 10 as shown in FIG. 1 and an aircraft 12 as shown in FIG. 2. During pre-production, exemplary method 10 may include specification and design 14 of the aircraft 12 and material procurement 16. During production, component and subassembly manufacturing 18 and system integration 20 of the aircraft 12 takes place. Thereafter, the aircraft 12 may go through certification and delivery 22 in order to be placed in service 24. While in service by a customer, the aircraft 12 is scheduled for routine maintenance and service 26 (which may also include modification, reconfiguration, refurbishment, and so on).

Each of the processes of method 10 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 12 produced by exemplary method 10 may include an airframe 28 with a plurality of systems 30 and an interior 32. Examples of high-level systems 30 include one or more of a propulsion system 34, an electrical system 36, a hydraulic system 38, and an environmental system 40. Any number of other systems may be included. Although an aerospace example is shown (aircraft, rockets), the principles of the invention may be applied to other industries, such as the automotive, railroad or tooling industry.

Apparatus and methods embodied herein may be employed during any one or more of the stages of the production and service method 10. For example, components or subassemblies corresponding to production process 18 may be fabricated or manufactured in a manner similar to components or subassemblies produced while the aircraft 12 is in service. Also, one or more apparatus embodiments, method embodiments, or a combination thereof may be utilized during the production stages 18 and 20, for example, by substantially expediting assembly of or reducing the cost of an aircraft 12. Similarly, one or more of apparatus embodiments, method embodiments, or a combination thereof may be utilized while the aircraft 12 is in service, for example and without limitation, to maintenance and service 26.

Figure 3:
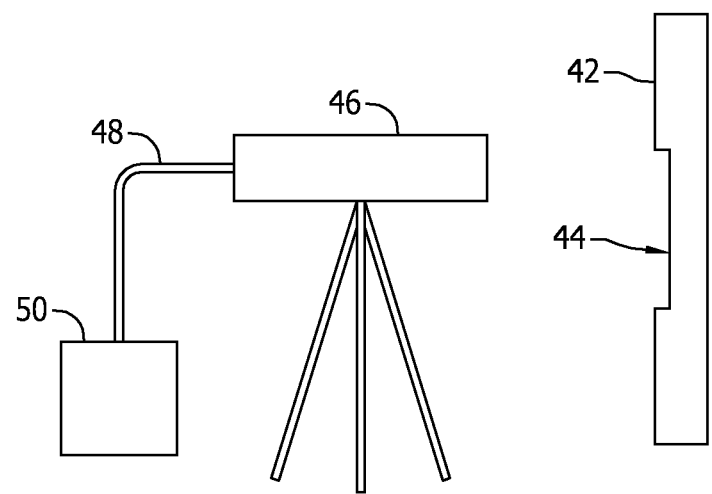
FIG. 3 is a representation of a side view of the photogrammetric optical scanner and projection system and the computerized control system of the apparatus positioned relative to a repair area on a portion of a composite structure.
Figure 4:
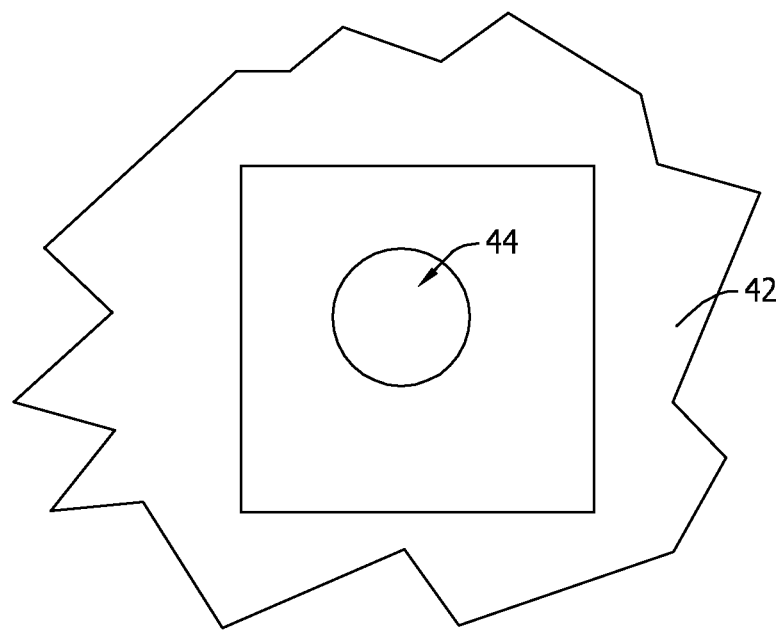
FIG. 4 is a representation of a front view of a portion of the composite structure and the repair area on the composite structure.

FIG. 3 is a representation of a side view of a portion of a composite structure 42 having an area 44 on a surface of the structure in need of repair. FIG. 4 is a representation of a front view of the portion of the composite structure 42 showing the repair area 44. FIG. 3 also shows a representation of component parts of the optical scanner and projection apparatus that is the subject of this disclosure. The component parts are positioned relative to the composite structure 42 for use in the repair of the repair area 44 of the composite structure.

Represented in FIG. 3 is a photogrammetric optical scanner and projection system 46 of the apparatus. The optical scanner and projection system are known in the art, for example the PlyGage system of Twin Coast 3D Metrology. The optical scanner of the system 46 is used to determine the spatial coordinates and sizes of the repair area 44, a thermocouple array used in the repair and yet to be described, and a heat blanket used in the repair and yet to be described relative to the portion of the composite structure 42 surrounding the repair area 44. The projection system is used to project temperature data recorded by the thermocouples of the thermocouple array back onto the surface of the composite structure 42 being repaired in the exact locations of the thermocouples where the temperature data is being recorded. The optical scanner and projection system 46 is represented in FIG. 3 as being connected in electronic communication 48 with a computerized control system 50 of the apparatus.

The computerized control system 50 receives information scanned by the optical scanner and projection system 46 and records that information. Additionally, the computerized control system 50 controls the optical scanner and projection system 46 to project onto the surface of the composite structure 42 identification information and temperature data information from the thermocouples of the thermocouple array placed on the composite structure 42 over the repair area 44 at the exact locations of the thermocouples, as will be explained.

Figure 18:
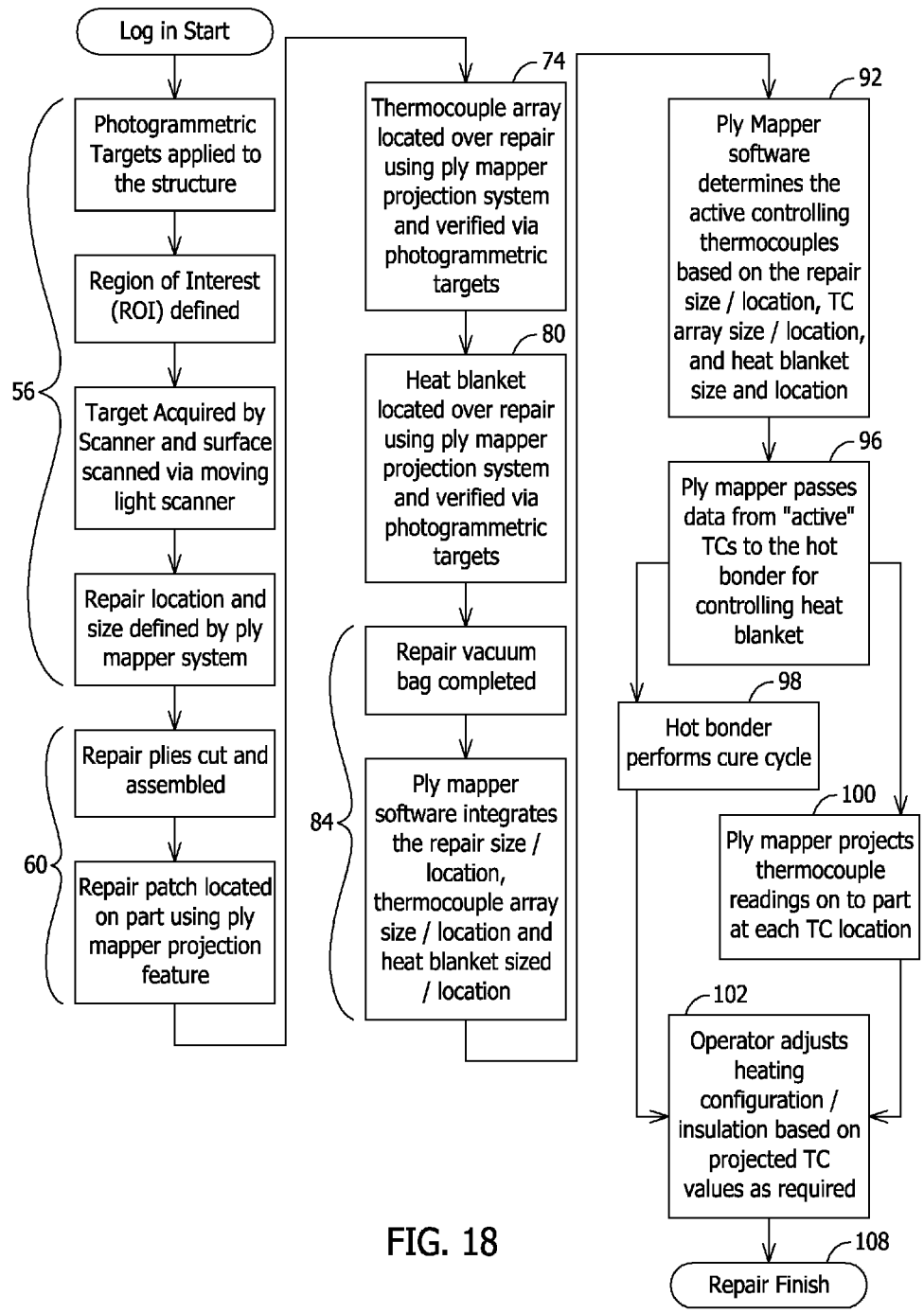
FIG. 18 is a flow diagram of the method of this disclosure.

The apparatus also is comprised of a plurality of structure targets 54 that can be scanned by the optical scanner and projection system 46. FIG. 4 is a representation of a front view of the portion of the composite structure 42 surrounding the repair area 44 with a plurality of the structure targets 54 having been attached to the surface of the composite structure. Each of the structure targets 54 displays information that is scannable by the optic scanner and projection system 46 that identifies the particular structure target. The optical scanner and projection system 46 can scan the surface of the composite structure 42 and transmit information on the locations and identities of the structure targets 54 attached to the composite structure 42, the location of the repair area 44 relative to the structure targets, and details of the repair area such as its shape and depth into the composite structure 42. All of this information is transmitted to the computerized control system 50 and digitally mapped by the system. All this is represented in the first four method steps 56 in the flow diagram of FIG. 18.

Figure 5:
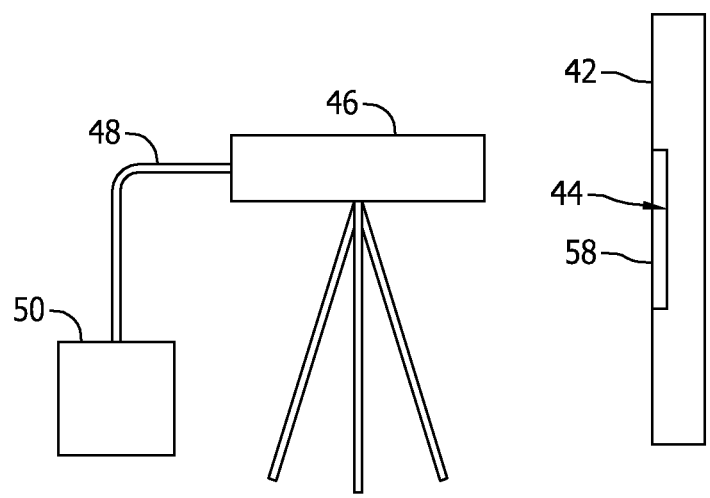
FIG. 5 is a representation similar to that of FIG. 3, but showing the composite ply and adhesive applied to the repair area on the composite structure.
Figure 6:
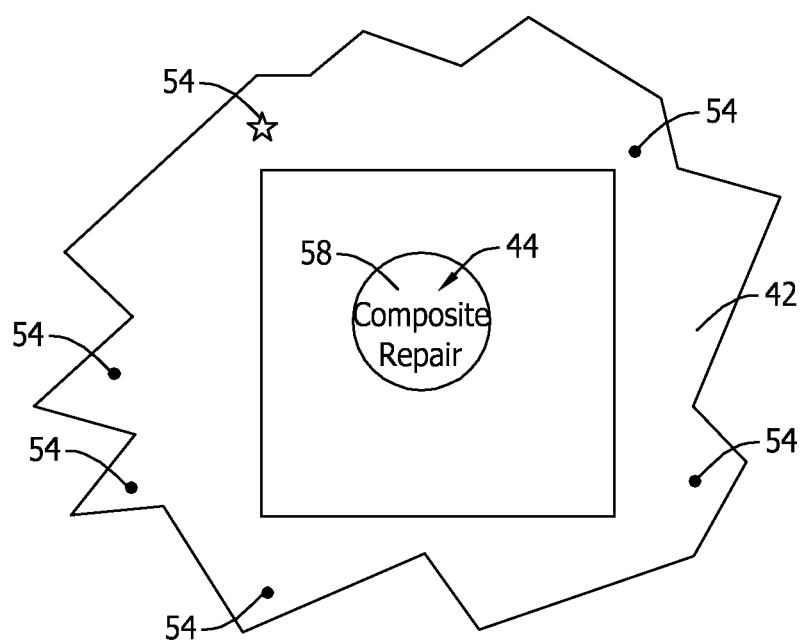
FIG. 6 is a representation of a front view of the portion of the composite structure with the composite ply and adhesive applied to the repair area.

With information on the repair area 44 having been scanned and recorded, a repair composite ply or plies are cut and assembled. With the repair plies assembled, the optical scanner and projection system 46 can be used to accurately position the plies and an adhesive in the repair area 44 of the composite structure 42. This is represented in FIGS. 5 and 6. FIG. 5 shows the composite ply and adhesive 58 positioned in the repair area 44 from a side view of the portion of the composite structure 42. FIG. 6 shows a front view of the portion of the composite structure 44 with the composite ply and adhesive 58 positioned in the repair area 44. Although only one composite ply is being referred to here, it should be understood that any number of composite plies needed to repair the repair area 44 as well as any type of adhesive are intended to be covered by this description. All this is represented in the subsequent two method steps 60 in the flow diagram of FIG. 18.

Any required separator films, bleeder materials and caul sheets (not shown) are then attached to the composite structure 42 over the repair area 44 in accordance with the particular repair procedure. The use of the films, materials and sheets can be different in different composite repairs, and therefore these are not shown in the drawing figures.

The apparatus also includes a plurality of thermocouples 62 arranged in a two-dimensional thermocouple array 64. The plurality of thermocouples 62 are fixed in the thermocouple array 64 at spaced relative positions of the plurality of thermocouples. For example, the thermocouple 62 arranged in the two-dimensional thermocouple array 64 can be sandwiched between two thin layers of heat resistant film to fix the thermocouple array in a flexible panel and maintain the desired grid arrangement and the spacing between adjacent thermocouples. For example, the thermocouples could be arranged in a 4"×4" grid pattern covering a two foot square area. The particular thermocouple array 64 would be dimensioned to completely cover over the composite ply and adhesive 58 applied to the repair area 44 of the composite structure 42. This eliminates the need for the repair operator individually attaching thermocouples to the repair area and mapping or sketching the locations and identities of each thermocouple in relation to the repair area.

Figure 7:
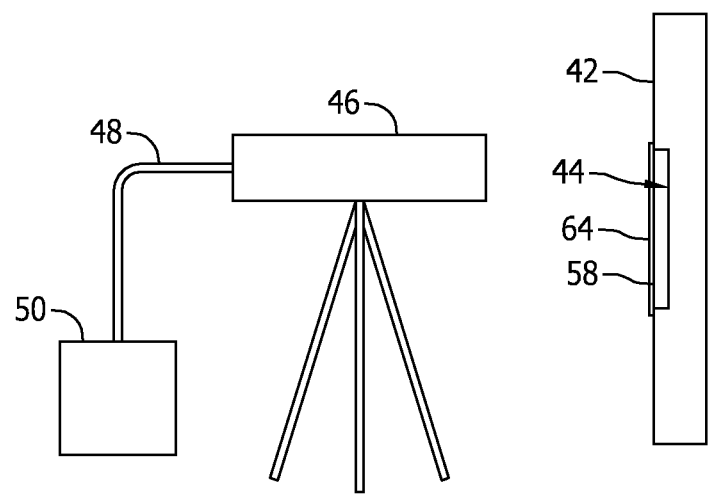
FIG. 7 is a representation similar to that of FIG. 5, but showing the thermocouple array attached to the composite structure over the repair area of the composite structure.
Figure 8:
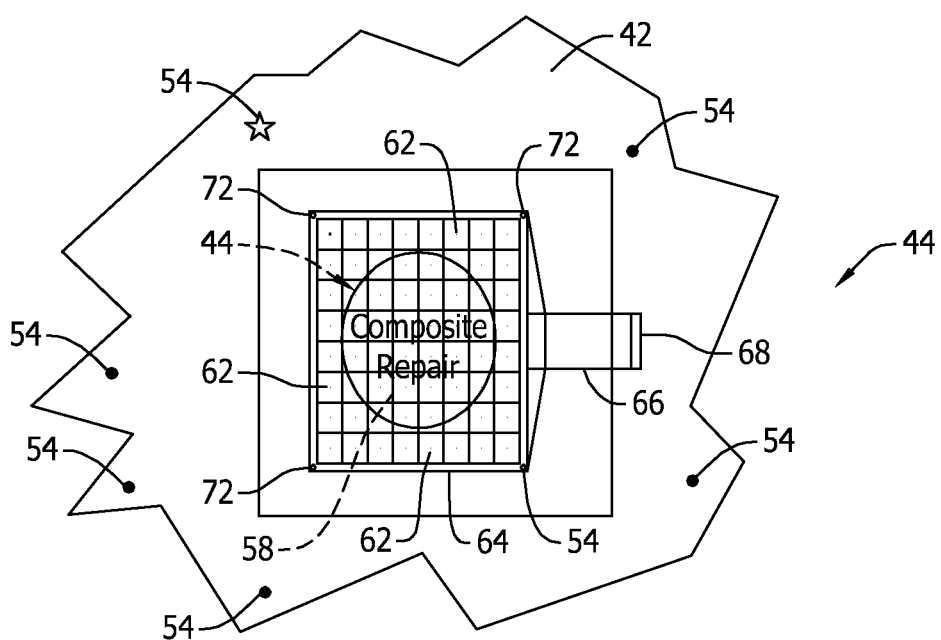
FIG. 8 is a representation of a front view of the portion of the composite structure with the thermocouple array attached to the composite structure over the repair area.

FIG. 7 is a representation of a side view of the portion of the composite structure 42 with the thermocouple array 64 attached over the repair area 44 of the composite structure. FIG. 8 is a representation of a front view of the portion of the composite structure 42 with the thermocouple array 64 attached to the composite structure over the repair area 44 and over the composite ply and adhesive 58 applied to the repair area. As represented in FIG. 8, a plurality of electrically conductive wires 66 extend from the thermocouple array 64. Each of the plurality of wires 66 communicates electronically with one of the thermocouples 62 in the thermocouple array 64 at a proximal end of the wire. The opposite distal ends of the wires 66 are secured together in a terminal block 68. The terminal block 68 positively identifies which of the thermocouple wires 66 communicates with each of the thermocouples 62 in the thermocouple array 64. This prevents the repair operator from incorrectly identifying or plugging thermocouple wires into an incorrect receptacle of a hot bonder.

At least one array target 72 is attached to the thermocouple array 64. In the representation of FIG. 8, four array targets 72 are shown attached to the thermocouple array 64. The array targets 72 have optically scannable information on the targets on an identification of each thermocouple in the thermocouple array 64, and a position of each thermocouple in the thermocouple array relative to the other thermocouples in the thermocouple array and relative to the array targets 72.

With the thermocouple array 64 attached to the composite structure 42 over the repair area 44, the computerized control system 50 controls the optical scanner and projection system 46 to scan the composite structure 42 and the thermocouple array 64 attached to the composite structure. The scan of the structure targets 54 and the array targets 72 identifies each thermocouple 62 and its position relative to the repair area 44 on the composite structure 42 and relative to the structure targets 54 on the composite structure. This information is recorded by the computerized control system 50. All this is represented in the subsequent method step 74 in the flow diagram of FIG. 18.

Figure 9:
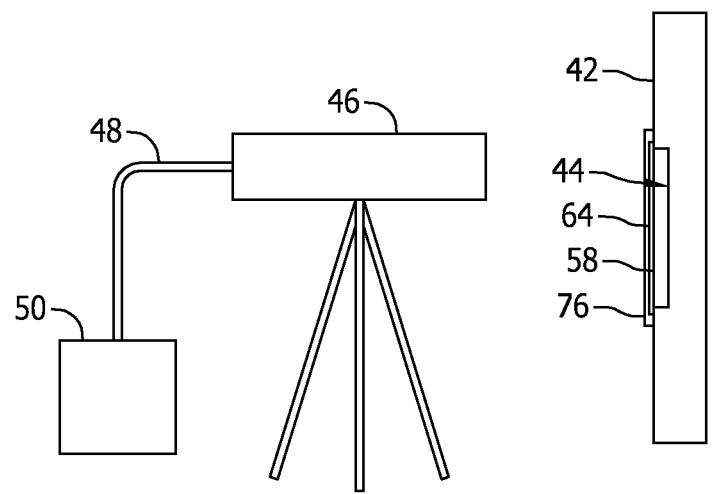
FIG. 9 is a representation similar to FIG. 7, but showing the heat blanket attached to the composite structure over the thermocouple array and the repair area of the composite structure.
Figure 10:
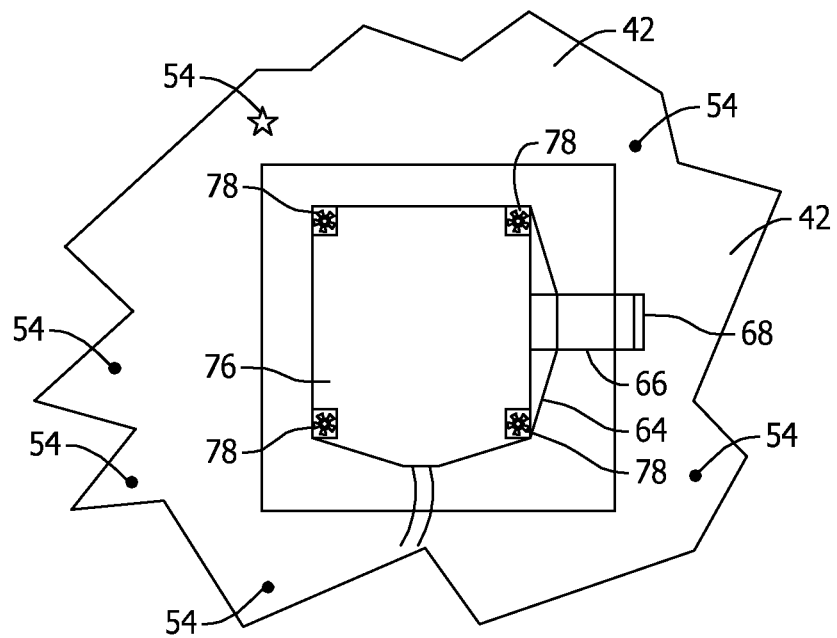
FIG. 10 is a representation of a front view of the portion of the composite structure with the heat blanket attached to the composite structure over the thermocouple array and the repair area of the composite structure.

The apparatus also includes a heat blanket 76. The heat blanket 76 is conventional in construction and operation, except that at least one blanket target 78 is attached to the heat blanket. In the representation of the heat blanket 76 in FIG. 10, four blanket targets 78 are shown attached to the blanket. The blanket targets 78 have optically scannable information on the size and shape of the heat blanket 76 and the orientation of the heat blanket. FIG. 9 is a representation of a side view of the portion of the composite structure 42 with the heat blanket 76 attached to the composite structure over the thermocouple array 64 and over the composite ply and adhesive 58 applied to the repair area 44. FIG. 10 is a representation of a front view of the portion of the composite structure 42 having the heat blanket 76 attached to the composite structure over the thermocouple array 64 and over the composite ply and adhesive 58 applied to the repair area 44. It can be seen in FIG. 10 that the heat blanket 76 attached to the composite structure 42 completely obscures the position of the thermocouple array 64 relative to the repair area 44. However, information on the position of the thermocouple array 64 and the thermocouples 62 of the array relative to the repair area 44 has been previously scanned and recorded in the computerized control system 50. With the heat blanket 76 attached to the composite structure 42, the computerized control system 50 controls the optical scanner and projection system 46 to scan the composite structure, the heat blanket 76 and the blanket targets 78 and identifies from the blanket targets the particular heat blanket being used, the size and shape of the heat blanket and the orientation of the heat blanket relative to the thermocouple array 64 and the repair area 44, and the location of the heat blanket 76 relative to the structure targets 54. This information is recorded by the computerized control system 50. All this is represented in the subsequent method step 80 of FIG. 18.

Figure 11:
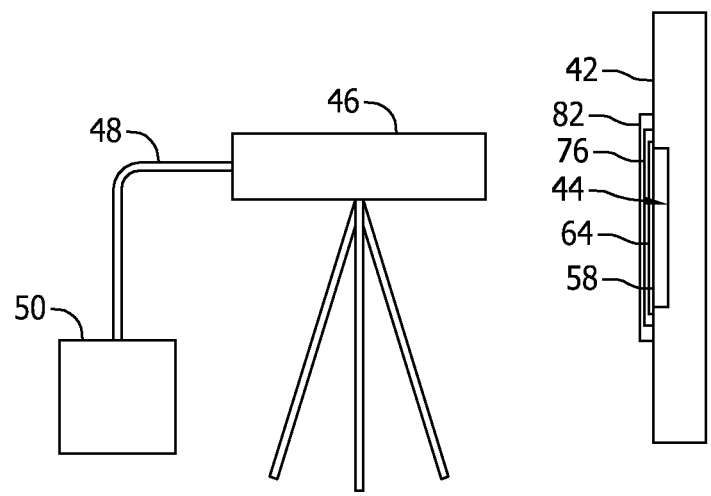
FIG. 11 is a representation similar to FIG. 9, but showing the vacuum bag attached to the composite structure over the heat blanket, the thermocouple array and the repair area of the composite structure.
Figure 12:
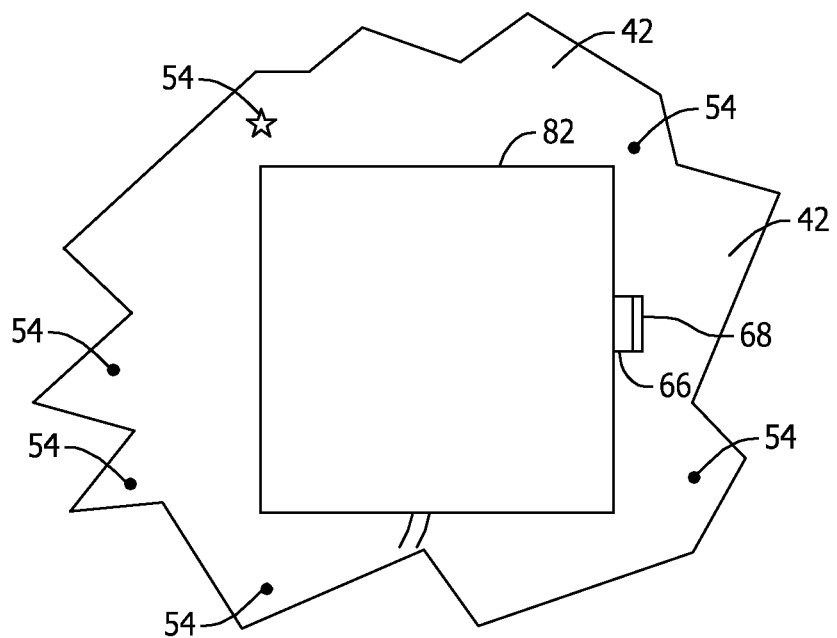
FIG. 12 is a representation of a front view of the portion of the composite structure with the vacuum bag attached to the composite structure over the heat blanket, the thermocouple array and the repair area of the composite structure.

The components of a vacuum bag 82 are then assembled and attached to the composite structure as represented in the side view of the portion of the composite structure 42 shown in FIG. 11 and the front view of the portion of the composite structure 42 shown in FIG. 12. The construction of the vacuum bag assembly and the operation of the vacuum bag assembly 82 are conventional. As represented in FIG. 12, the vacuum bag assembly 82 is attached to the composite structure 42 at a position of the vacuum bag that covers the heat blanket 76, the thermocouple array 64 and the repair area 44. However, the vacuum bag assembly 82 is dimensioned to be within the structure targets 54 attached to the composite structure 42 when the vacuum bag assembly is attached to the composite structure. Although the view of the repair area 44 and the thermocouple array 64 are obscured by the vacuum bag attached to the composite structure 42, the computerized control system 50 of the apparatus controls the optical scanner and projection system 46 to project information onto the vacuum bag assembly 82 that identifies each thermocouple 62 in the thermocouple array 64 under the vacuum bag assembly 82, the location of each thermocouple 62 and the real-time temperature data of each thermocouple 62. All this is represented in the two subsequent method steps 84 of FIG. 18. The repair operator does not have to mark on the vacuum bag the thermocouple identity at the thermocouple location.

Figure 13:
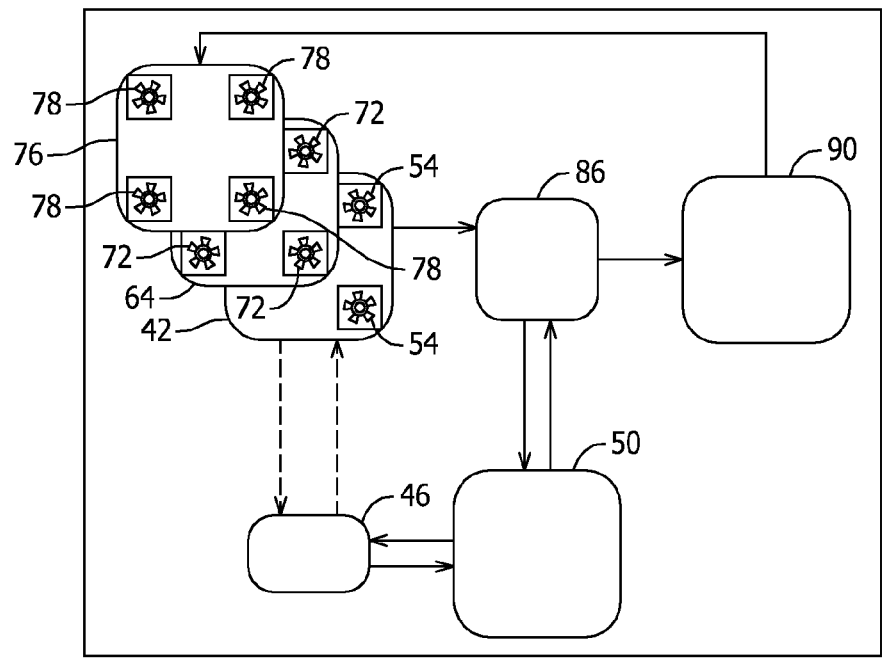
FIG. 13 is a schematic representation of the optical scanner and projection apparatus for thermal management of composite repairs that is the subject of this disclosure.

FIG. 13 is a schematic representation of the apparatus after the thermocouple array 64, the heat blanket 76 and the vacuum bag assembly 82 have been attached to the composite structure 42. In FIG. 13 the wiring 66 from the thermocouples 62 of the thermocouple array 64 is shown electrically communicated with a thermocouple integrator/pass through box 86. The thermocouple integrator/pass through box 86 is conventional in construction and operation. The thermocouple integrator/pass through box 86 is shown electrically communicated with the computerized control system 50 of the apparatus, the thermocouple array 64 and a hot bonder 90. The hot bonder 90 in turn is electrically communicated with the heat blanket 76. The hot bonder 90 is conventional in construction and operation.

Figure 14:
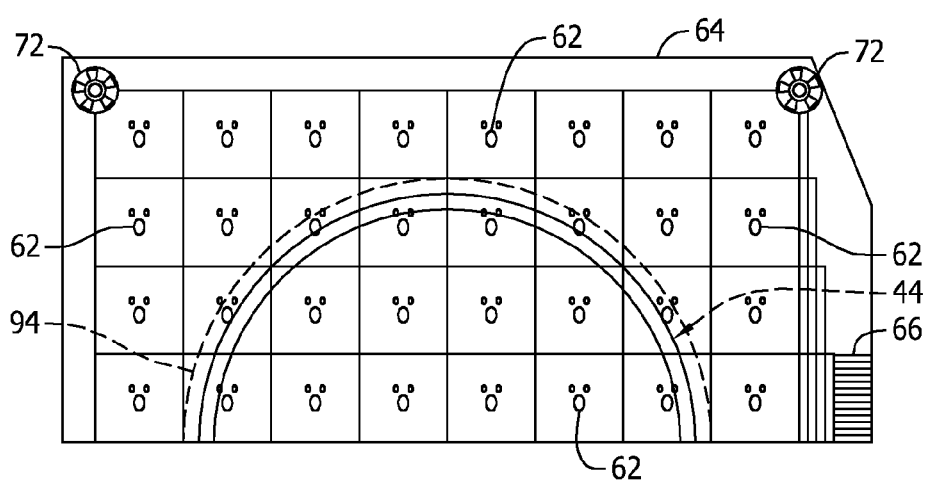
FIG. 14 is a representation of the thermocouple array attached to the composite structure over the repair area of the composite structure during an initial step in the method of operating the apparatus.
Figure 15:
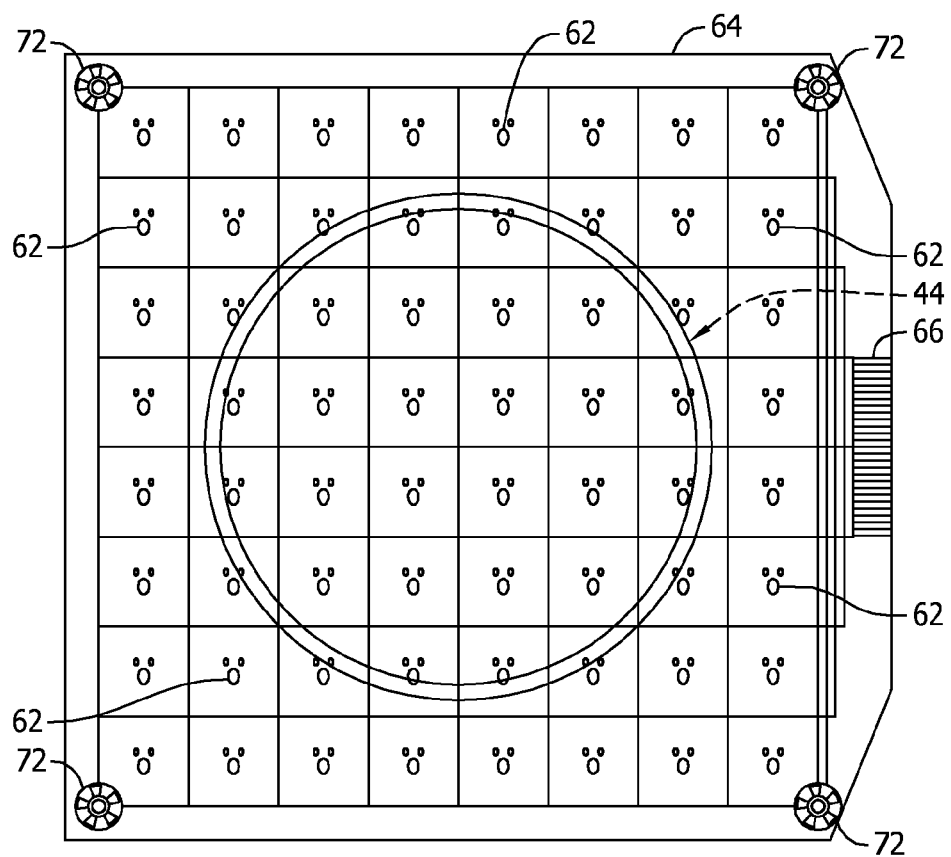
FIG. 15 is a representation of the thermocouple array attached to the composite structure over the repair area of the composite structure during a further step in the method of operating the apparatus.

The operation of the apparatus is controlled by the computerized control system 50. From the information supplied to the control system 50 by the optical scanner and projection system 46, the control system integrates the spatial locations and sizes of the repair area 44, the thermocouple array 64, and the heat blanket 76. Based on the spatial relationships, the control system 50 determines which thermocouples in the thermocouple array 64 are required to control the repair cure, i.e., which thermocouples of the thermocouple array 64 are positioned over or in the immediate vicinity of the repair area 44. These thermocouples are determined by the computerized control system 50 to be the "active" thermocouples in the repair cure. The active thermocouples of the thermocouple array 64 are represented in FIG. 14 as the thermocouples within the dashed line 94 that surrounds the repair area 44. Data from these active thermocouples is passed to the controller of the hot bonder 90. The thermocouples outside the dashed line 94 in FIG. 14 are outside of the repair area 44 and information from these thermocouples is not considered by the computerized control system 50. Optionally, the data from the non-controlling thermocouples could also be displayed for informational purposes while not affecting the cure control if desired by the operator.

The hot bonder 90 is programmed and operated normally. The heat blanket 76 is activated to supply heat to the repair area 44 and the area of the composite structure 42 covered by the heat blanket to initiate the cure of the composite ply(s) and adhesive applied to the repair area.

During the repair cure the optical scanner and projection system 46 of the apparatus is active. The optical scanner and projection system 46 projects onto the surface of the vacuum bag assembly 82 an identification of each active thermocouple at the position of the active thermocouple recorded into the computerized control system 50 as well as the real time temperature of each active thermocouple. The projected information could be numerical, could be color coded or both. The projected information could be color coded to alert the repair operator to any problem locations of the repair area 44. For example, cold areas of the repair area 44 could be illuminated in blue and hot areas in read. By watching the projected thermal data on the surface of the vacuum bag assembly 82, the repair operator knows precisely where insulation must be placed on the vacuum bag, or insulation removed from the vacuum bag. Since the data is projected onto the part, no information will be obscured or removed by an addition or subtraction of external insulation. This is represented in the method step 102 of the flow diagram of FIG. 18. With a uniform temperature achieved across the repair area 44, the repair cure continues until complete. This is represented in the method step 104 of the flow diagram of FIG. 18.

Figure 16:
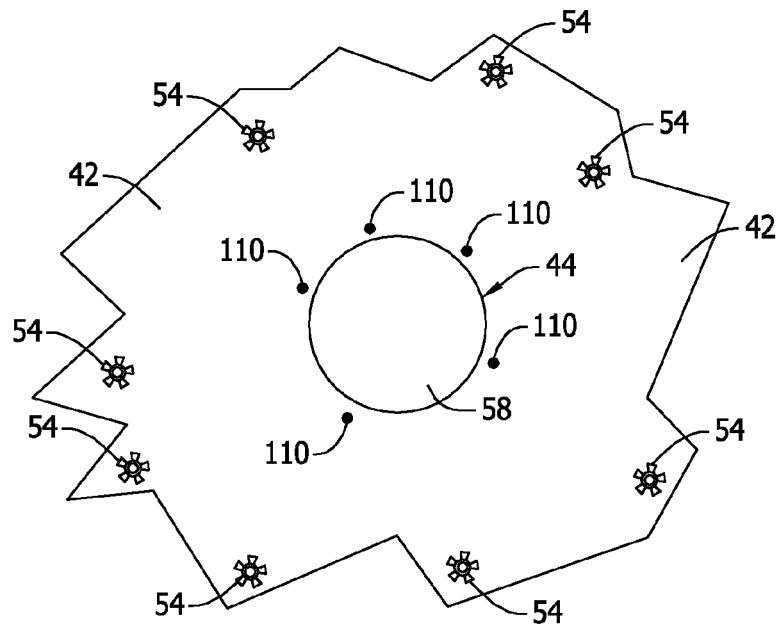
FIG. 16 is a representation of a front view of a further embodiment of the apparatus attached to a portion of a composite structure around a repair area of the composite structure.

FIG. 16 is a representation of the front view of the portion of the composite structure 42 and the repair area 44 of the composite structure with which a further embodiment of the apparatus is used in the thermal management of a composite repair. In the embodiment represented in FIG. 16 the composite ply and adhesive 58 have been applied to the repair area 44 in substantially the same manner as the previously described embodiment. Additionally, the structure targets 54 of the apparatus have been attached to the composite structure 42 at positions surrounding the repair area 44 as in the previously described embodiment.

FIG. 16 represents a composite repair where the thermocouple array of the previously described embodiment cannot be used. In the embodiment of FIG. 16, thermocouples 110 are individually attached to the portion of the composite structure 42 in a conventional manner.

Figure 17:
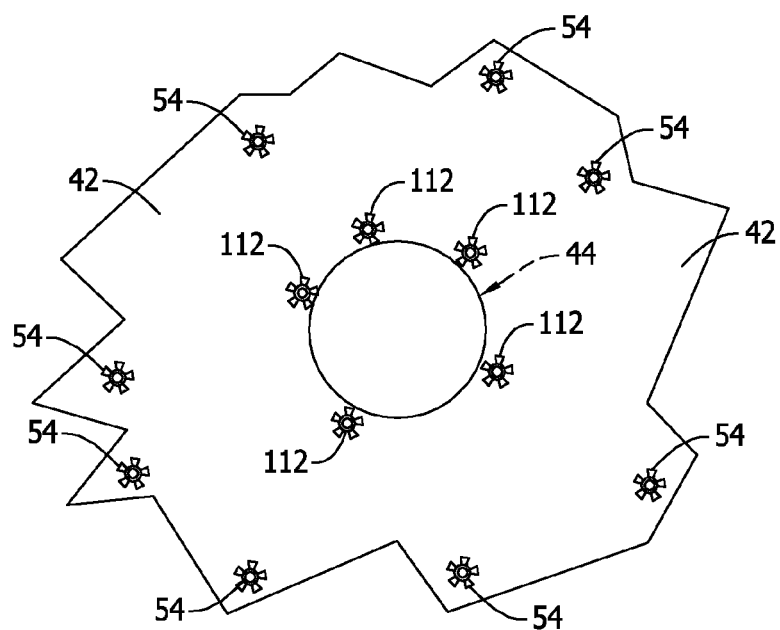
FIG. 17 is a representation similar to FIG. 16 of the front view of a portion of the composite structure with a further embodiment of the apparatus attached to the composite structure around a repair area of the composite structure.

Coded thermocouple targets 114 are then attached to the composite structure 42 on top of each thermocouple 110. This is represented in FIG. 17. The coded thermocouple targets 112 have identification information on each target for each thermocouple 110 on which the target is placed.

The optical scanner and projection system 46 is then controlled by the computerized control system 50 in much the same manner as the previously described embodiment. The system 46 scans the structure targets 54 and the thermocouple targets 112 on the composite structure 42 and the computerized control system 50 precisely records the identification of each structure target 54 and thermocouple target 112, and the location of each structure target 54 and thermocouple target 112 relative to the repair area 44 of the composite structure 42.

With the spatial relationships of the structure targets 54, the thermocouple targets 112 and the composite repair 44 read into the computerized control system 50, the repair cure is conducted in much the same manner as the previously described embodiment.

As various modifications could be made in the construction of the apparatus and its method of construction herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An apparatus for thermal management of a composite repair, the apparatus comprising:
   a plurality of thermocouples arranged in a two-dimensional thermocouple array, the plurality of thermocouples being fixed in the thermocouple array at spaced relative positions, the plurality of thermocouples in the thermocouple array being fixed on a flexible panel that maintains a desired grid arrangement of the plurality of thermocouples in the thermocouple array and the spaced relative positions of the plurality of thermocouples in the thermocouple array, the thermocouple array fixed on the flexible panel being attachable to a composite structure and being dimensioned to cover over a repair area on the composite structure;
   at least one array target on the thermocouple array;
   a photogrammetric scanner system that is operable to optically scan the composite structure, the thermocouple array attached to the composite structure and the array target on the thermocouple array;
   a control system communicating with the plurality of thermocouples in the thermocouple array and receiving temperature information from a thermocouple of the plurality of thermocouples, the control system also communicating with the photogrammetric scanner system and receiving information scanned by the photogrammetric scanner system; and,
   an optical projection system in communication with the control system, the optical projection system being operable by the control system to project to a thermocouple position in the thermocouple array an identification of the thermocouple and information on the thermocouple real time temperature.

2. The apparatus of claim 1, further comp sing:
   the plurality of thermocouples in the thermocouple array are sandwiched between two thin layers of heat resistant film that form the flexible panel and fix the plurality of thermocouples in the thermocouple array on the flexible panel in the spaced relative positions of the plurality of thermocouples.

3. The apparatus of claim 1, further comprising:
   an at least one array target having optically scannable information on the array target on a size of the thermocouple array and a number of thermocouples in the thermocouple array.

4. The apparatus of claim 1, further comprising:
   the at least one array target on the thermocouple array being one of a plurality of array targets on the thermocouple array.

5. The apparatus of claim 1, further comprising:
   a plurality of separate photogrammetric structure targets that are each attachable to the composite structure at spaced positions of the structure targets on the composite structure around the repair area, each structure target of the plurality of structure targets having optically scannable information on the structure target on an identification of the structure target; and,
   the photogrammetric scanner system being operable to optically scan the composite structure with the plurality of separate structure targets attached to the composite structure and receive information on the positions of the plurality of structure targets on the composite structure around the repair area, information on the identity of each structure target at each position on the composite structure, information on the repair area, information on a position of the repair area relative to the positions of the plurality of structure targets, and information on the position of each thermocouple of the plurality of thermocouples in the thermocouple array attached to the composite structure relative to each structure target attached to the composite structure, relative to the repair area and relative to the position of the repair area on the composite structure.

6. The apparatus of claim 1, further comprising:
   a plurality of electrical conductors connected to the thermocouple array, each electrical conductor of the plurality of electrical conductors having a proximal end that communicates with a thermocouple of the plurality of thermocouples in the thermocouple array and an opposite distal end that communicates with a terminal block; and,
   a hot bonder having a terminal receptacle, the terminal receptacle and the terminal block being releasably connectable to electrically communicate the plurality of thermocouples in the thermocouple array with the hot bonder.

7. The apparatus of claim 1, further comprising:
   a heat blanket that is attachable to the composite structure over the thermocouple array when the thermocouple array is attached to the composite structure; and,
   at least one blanket target on the heat blanket, the blanket target having optically scannable information on the blanket target on a size of the heat blanket and an orientation of the heat blanket.

8. The apparatus of claim 7, further comprising:
   the at least one blanket target on the heat blanket being one of a plurality of blanket targets on the heat blanket.

9. The apparatus of claim 7, further comprising:
   the optical projection system being operable by the control system to project to a thermocouple position and on the heat blanket when the heat blanket is attached to the composite structure over the thermocouple array an identification of the thermocouple and information on a real time temperature of the thermocouple.

10. The apparatus of claim 9, further comprising:
a vacuum bag assembly that is attachable to the composite structure over the heat blanket when the heat blanket is attached to the composite structure over the thermocouple array; and,
the optical projection system being operable by the control system to project to a thermocouple position and on the vacuum bag an identification of the thermocouple and information on a real time temperature of the thermocouple.

11. An apparatus for thermal management of a composite repair, the apparatus comprising:
a plurality of separate structure targets that are each attachable to a composite structure at spaced positions of the structure targets on the composite structure around a repair area, each structure target of the plurality of structure targets having optically scannable information on the structure target on an identification of the structure target;
a plurality of thermocouples arranged in a two-dimensional thermocouple array, the plurality of thermocouples being fixed in the thermocouple array at spaced relative positions, the plurality of thermocouples in the thermocouple array being fixed on a flexible panel that maintains a desired grid arrangement of the plurality of thermocouples in the thermocouple array and the spaced relative positions of the plurality of thermocouples in the thermocouple array, the thermocouple array fixed on the flexible panel being attachable to the composite structure and being dimensioned to completely cover a composite ply and an adhesive applied to the repair area on the composite structure when the thermocouple array is attached to the composite structure;
a plurality of array targets on the thermocouple array, each of the array targets having optically scannable information on the array target on an identification of each thermocouple in the thermocouple array and on a position of each thermocouple in the thermocouple array relative to the other thermocouples in the thermocouple array and relative to each array target;
a photogrammetric scanner system that is operable to optically scan the composite structure, the plurality of structure targets attached to the composite structure, the thermocouple array attached to the composite structure and the array targets on the thermocouple array
a control system communicating with the plurality of thermocouples in the thermocouple array to receive temperature information from a thermocouple of the plurality of thermocouples, the control system also communicating with the photogrammetric scanner system and receiving information scanned by the photogrammetric scanner system; and,
an optical projection system communicating with the control system, the optical projection system being operable by the control system to project to a thermocouple position in the thermocouple array an identification of the thermocouple and information on the thermocouple real time temperature.

12. The apparatus of claim 11, further comprising:
a heat blanket that is attachable to the composite structure over the thermocouple array when the thermocouple array is attached to the composite structure; and,
a plurality of blanket targets on the heat blanket, the plurality of blanket targets each having optically scannable information on the blanket target on a size of the heat blanket and an orientation of the heat blanket.

13. The apparatus of claim 12, further comprising:
the optical projection system being operable by the control system to project to a thermocouple position and on the heat blanket when the heat blanket is attached to the composite structure over the thermocouple array an identification of the thermocouple at the thermocouple position and information on the thermocouple real time temperature.

14. The apparatus of claim 13, further comprising:
a vacuum bag that is attachable to the composite structure over the heat blanket when the heat blanket is attached to the composite structure over the thermocouple array; and,
the optical projection system being operable by the control system to project to a thermocouple position and on the vacuum bag an identification of the thermocouple at the thermocouple position and information on the thermocouple real time temperature.

15. The apparatus of claim 11, further comprising:
the plurality of thermocouples in the thermocouple array are sandwiched between two thin layers of heat resistant film that form the flexible panel and fix the plurality of thermocouples in the thermocouple array on the flexible panel in the spaced relative positions of the plurality of thermocouples.

16. A method of thermal management of a composite ply and adhesive applied to a repair area on a composite structure to control curing of the composite ply and the adhesive applied to the repair area, the method comprising:
arranging a plurality of thermocouples in a two-dimensional thermocouple array with the plurality of thermocouples being fixed at spaced relative positions in the thermocouple array;
fixing the plurality of thermocouples in the thermocouple array on a flexible panel and maintaining a desired grid arrangement of the plurality of thermocouples in the thermocouple array and the spaced relative positions of the plurality of thermocouples in the thermocouple array;
attaching the thermocouple array to the composite structure with the thermocouple array covering over the composite ply and the adhesive applied to the repair area on the composite structure;
attaching a plurality of array targets on the thermocouple array with the array targets having optically scannable information on identifications of the thermocouples in the thermocouple array and on positions of the thermocouples in the thermocouple array relative to the other thermocouples in the thermocouple array and relative to the array targets;
optically scanning the composite structure, the thermocouple array attached to the composite structure and the array targets on the thermocouple array with a photogrammetric scanner system and receiving the scannable information on the array targets;
communicating the plurality of thermocouples in the thermocouple array and the photogrammetric scanner system with a control system that receives temperature information from the plurality of thermocouples and receives information scanned by the photogrammetric scanner system; and,
communicating the control system with an optical projection system that is controlled by the control system to project to the thermocouple positions in the thermocouple array an identification of the thermocouples and information on the thermocouples real time temperatures.

17. The method of claim 16, further comprising:

attaching a heat blanket to the composite structure over the thermocouple array; and, attaching a plurality of blanket targets on the heat blanket with the blanket targets having optically scannable information on the blanket targets on a size of the heat blanket and an orientation of the heat blanket.

18. The method of claim 17, further comprising:

controlling the optical projection system by the control system to project to the thermocouple positions and onto the heat blanket identifications of the thermocouples in the thermocouple array and information on the thermocouple real time temperatures.

19. The method of claim 18, further comprising:

attaching a vacuum bag to the composite structure over the heat blanket; and, controlling the optical projection system by the control system to project to the thermocouple positions and onto the vacuum bag identifications of the thermocouples and information on the thermocouple real time temperatures.

20. The method of claim 16, further comprising:

fixing the plurality of thermocouples in the thermocouple array on the flexible panel by sandwiching the plurality of thermocouples in the thermocouple array between two thin layers of heat resistant film that form the flexible panel and fix the plurality of thermocouples in the thermocouple array on the flexible panel in the spaced relative positions of the plurality of thermocouples.

\* \* \* \* \*